3,227,646
HYDRODENITRIFICATION PROCESS AND CATALYSTS

Robert L. Jacobson, Pinole, and Robert H. Kozlowski, Berkeley, Calif., assignors to Chevron Research Company
No Drawing. Filed Feb. 28, 1963, Ser. No. 261,876
3 Claims. (Cl. 208—254)

This application is a continuation-in-part of our copending application Serial No. 90,382, filed February 20, 1961, now abandoned, and entitled "Catalytic Hydrodenitrification Process"; which is in turn a continuation-in-part of our copending application Serial No. 12,319, filed March 2, 1960, now U.S. Patent No. 3,114,701, and also entitled "Catalytic Hydrodenitrification Process." The present invention is based in part on subject matter common to both of these prior applications and hence the present application is also a continuation-in-part of the aforesaid Serial No. 12,319.

This invention relates to processes and catalysts for the selective hydrogenative removal of nitrogen compounds from hydrocarbon streams. In particular, the invention relates to novel catalysts and compositions and methods of preparing said catalysts, which catalysts when so prepared are characterized by high specific activity for the removal of contaminating nitrogen compounds from high boiling hydrocarbon oils.

It has long been known that nitrogen compounds could be removed to some extent from petroleum hydrocarbons by conventional hydrofining processes. However, even in the case of relatively low boiling feed stocks, substantially complete nitrogen removal cannot be accomplished by conventional hydrofining without the use of rather severe conditions of temperature and pressure and a relatively low space velocity. In the hydrofining process the hydrocarbon oil is treated with hydrogen at elevated temperature and pressure in contact with various catalysts generally comprising chromium and/or molybdenum oxides together with iron, cobalt, and/or nickel oxides on a porous oxide support, such as alumina or silica-alumina. Previous investigations into the effect of the metals content of the hydrofining catalysts on their activity indicated that there is little to be gained by the use of metal contents above 14%. For example, it is indicated in Patent No. 2,758,957 to K. Nozaki that increasing the total metals concentration above 15% by weight is of little benefit, and that decreasing the nickel content of a Ni–Mo catalyst to an atomic ratio of 1:3 increased the activity for hydrogenation.

In the aforementioned original application Serial No. 12,319 it is disclosed that for the purpose of substantially completely removing contaminating nitrogen compounds from distillable hydrocarbon oils to low residual nitrogen levels, catalysts containing large concentrations of both nickel and molybdenum are outstanding in their properties and are not the equivalent of the large group of catalytic materials disclosed in the prior art. Specifically, said application disclosed the use in a hydrodenitrification process of catalysts comprising sulfide nickel and molybdenum on alumina, containing 4–10% nickel together with 15.5–30% molybdenum, by weight, expressed as the metals. The greatest specific activity for nitrogen removal was found to be in the range of molybdenum contents between about 19% and about 30% molybdenum. When the catalysts were prepared by impregnation of predominantly alumina support with compounds of nickel and molybdenum, the catalysts were found to have a peak or maximum activity in the range between about 19% and about 25% molybdenum. In contrast thereto, however, it was also disclosed that a catalyst containing about 5% nickel and about 15.5% molybdenum had high activity when the catalyst was prepared by impregnating a coprecipitate of molybdenum and aluminum with nickel and additional molybdenum.

In the aforesaid application Serial No. 90,382 there is also disclosed the preparation of nickel-molybdenum-alumina catalysts by a combination of coprecipitation of molybdenum and aluminum compounds followed by impregnation of the coprecipitate with a nickel compound, which catalysts were found to be superior in activity to the impregnated catalysts in the range between 15.5 and 19% molybdenum and in the range above about 25% molybdenum, when the nickel content was at least 4%. The present application is directed to these catalysts wherein molybdenum and aluminum are coprecipitated, which are characterized by high activity for nitrogen removal, when sulfided, substantially independent of molybdenum content in the range between about 15.5% and about 30% molybdenum, as compared to the catalysts prepared entirely by impregnation of preformed alumina, which have peak activity in the range between about 19% and about 25% molybdenum. It is thus apparent that the high activity substantially independent of molybdenum content in the range above 15.5% molybdenum is imparted by the method of preparing the catalysts of this invention.

In general, the catalysts of the present invention are prepared by simultaneously precipitating a molybdenum compound and an aluminum compound to form a coprecipitate, calcining the coprecipitate to form a molybdenum oxide-aluminum oxide composite, impregnating the calcined composite with a nickel compound convertible to the oxide by calcination, and calcining the impregnated composite to form a nickel oxide-molybdenum oxide-alumina catalyst.

In a preferred specific embodiment of the invention the coprecipitate of molybdenum and aluminum compounds is formed by rapidly pouring together a basic solution of a molybdenum compound, preferably an ammoniacal ammonium molybdate solution, and an acidic solution of an aluminum compound, preferably an acidic aluminum salt such as the chloride or nitrate. When the solutions are poured together in the proper proportions, they just neutralize each other resulting in the precipitation of a coprecipitate of molybedenum and aluminum oxides, hydroxides, and/or hydrates thereof. The resulting gelatinous precipitate is separated from the supernatant liquid containing the salt formed by reaction of the cation of the molybdenum compound with the anion of the aluminum compound, washed thoroughly to remove such salts and other contaminants from the gel, dried slowly to remove residual moisture, and then calcined at an elevated temperature of 900–1200° F. to form a molybdenum oxide-aluminum oxide composite of high surface area and porosity. This material is then impregnated with nickel by immersing it in a solution of a nickel compound convertible to the oxide by calcination, such as nickel nitrate, acetate, or carbonate. The impregnated composite is dried, and then calcined at a temperature in the range between 600 and 1100° F. to form a nickel oxide-molybdenum oxide-alumina catalyst. The amount of molybdenum coprecipitated with the alumina in the first step is sufficient to provide all of the molybdenum required in the final catalyst.

In another embodiment only a portion, preferably about half, of the molybdenum is coprecipitated with the alumina, and the calcined nickel oxide-molybdenum, oxide-alumina catalyst is then further increased in molybdenum content up to the desired range by impregnating with a molybdenum compound convertible to the oxide by calcination, such as ammonium molybdate, drying, and calcining. This longer procedure has been found to be particularly valuable in the preparation of catalysts having a total molybdenum content in the range between about 15.5 weight percent and about 19 weight percent, in achieving higher activity for the specific reaction of hydrogenating nitrogen compounds to ammonia.

Both methods of preparation, i.e., coprecipitation of molybdenum and aluminum followed by nickel impregnation, and coprecipitation of molybdenum and aluminum followed by nickel impregnation and by molybdenum impregnation, are surprisingly found to result in the formation of catalysts which have higher activity for the specific reaction of converting to ammonia nitrogen compounds found in the highest boiling portions of hydrocarbon distillates, as compared to the activity of catalysts of similar compositions prepared entirely by impregnation of preformed alumina, even though they are not always significantly more active, and in some cases are less active, for the conversion to ammonia of nitrogen compounds found in the lower boiling portions of hydrocarbon distillates.

The above mentioned surprising features will be further apparent from the following examples illustrating the preparation of catalysts in accordance with the present invention, as compared to impregnation techniques, and comparing the differences in activity for nitrogen removal when sulfided.

The first example illustrates the preparation of a high molybdenum content catalyst by coprecipitation of molybdenum and aluminum compounds followed by impregnation with nickel.

EXAMPLE 1

A first solution was prepared by dissolving 2115 grams of $AlCl_3 \cdot 6H_2O$ in 6 liters of water; a second solution was prepared by dissolving 500 grams of $MoO_3$ and 2738 ccs. of concentrated $NH_4OH$ in 5 liters of water; and a third solution was prepared by dissolving 50 grams of brown flake animal glue in 5 liters of water. The first and second metal-containing solutions were added to the third solution slowly over a period of about six hours while controlling the relative proportions added to maintain the pH of the resulting mixture between 6 and 7, stirring vigorously while adding. About 1 liter of the ammoniacal molybdenum solution was not used in view of the requirement that the pH be controlled near neutrality. A precipitate formed immediately and continuously when the solutions were mixed. The resulting coprecipitate was separated from the supernatant liquor by filtration and washed five times with distilled water to remove the last traces of ammonium chloride. The washed gelatinous material was then dried slowly in an oven for 72 hours at 120° F. and for 15 hours at 300° F. The dried material was then calcined for 4 hours at 900° F. and then crushed and screened to particles of between 20 and 40 mesh. The calcined molybdenum oxide-aluminum oxide composite was then impregnated with nickel by immersing in a 7% solution of nickel nitrate in water, containing 138.5 grams of nickel nitrate hexahydrate. The impregnated material was then dried for 8 hours at 300° F. and calcined for 4 hours at 900° F. The final catalyst analyzed 7% nickel and 30% molybdenum; and had a surface area of 273 square meters per gram (BET method), a pore volume of 0.23 cubic centimeter per gram, and a density of 1 gram per cubic centimeter.

The activity of the catalyst prepared in Example 1 for the hydrogenation of nitrogen compounds contained in hydrocarbon oils to ammonia (hydrodenitrification) was then determined in relative activity tests. It has been found that the hydrodenitrification reaction closely approximates a pseudo first-order rate reaction with respect to the fractional removal of the initial nitrogen content over the range of operating conditions utilized, i.e., $-\log (1-x) = kt$, where $x$ is the percent nitrogen removal expressed as a decimal, $t$ is the contact time (inversely proportional to LHSV), and $k$ is the reaction rate constant (proportional to relative activity). By comparing catalysts at the same operating conditions of temperature and pressure with a given feed, the reaction rate constant can be determined and the catalysts can accordingly be ranked in terms of relative activity. On this basis a relative activity for hydrodenitrification of 1.0 has been assigned to a commercially available hydrofining catalyst containing 6.8% molybdenum and 2.7% cobalt, prepared by the method described and claimed in Patent No. 2,878,193 to J. W. Scott, hereinafter designated catalyst A. Other commercially available hydrofining catalysts composed of molybdenum and nickel or cobalt supported on alumina or silica-alumina of similar metal contents have been found to be substantially equivalent to this catalyst in terms of relative activity for nitrogen removal. On the other hand, catalysts consisting essentially of nickel, molybdenum, and alumina and containing between 4 and 10% nickel and between 15.5 and 30% molybdenum have been found to be from 3 to 5 times as active as the conventional catalysts for nitrogen removal when sulfided, as disclosed in our previously mentioned applications. In particular, a specially preferred catalyst, containing about 7% nickel and about 21% molybdenum on alumina, prepared by successive impregnations of a preformed alumina with nickel nitrate and ammonium molybdate, has a relative activity of about 4.5 as compared to the conventional cobalt-molybdenum hydrofining catalyst A. The following example presents comparisons of this highly active catalyst prepared by impregnation with the catalyst prepared in Example 1.

EXAMPLE 2

The catalyst prepared in Example 1 and the 7% nickel–21% molybdenum catalyst prepared by impregnation were placed in separate tubes of a multiple bed pilot reactor and sulfided therein by passing vaporized dimethyldisulfide in hexane and hydrogen into contact with the catalysts at about 450° F. A heavy straight run gas oil distillate of crude petroleum was then passed into contact with the catalysts at hydrogenation process conditions. In similar separate runs a catalytically cracked light cycle oil was used on the feed. The properties of the feeds are shown in Table I; the operating conditions and results are shown in the following Table II, wherein the nitrogen content of the products is the total parts per million of nitrogen (Kjeldahl) remaining in the oils after cooling the reactor effluents, separating the liquid products from the hydrogen and light gases, and washing the oils with water to remove the by-product ammonia.

*Table I*

| Feed | Heavy Gas Oil | Light Cycle Oil |
| --- | --- | --- |
| Gravity, ° API | 22.2 | 25.8 |
| Aniline Point, ° F | 146 | 97 |
| Sulfur, wt. percent | 1.55 | 0.9 |
| Nitrogen, p.p.m. | 2,970 | 775 |
| ASTM D-1160: | | |
| 10% | 683 | 475 |
| 50% | 737 | 527 |
| 90% | 791 | 593 |
| EP | 861 | 664 |

Table II

| Feed | Heavy Gas Oil | | Light Cycle Oil | |
|---|---|---|---|---|
| Catalyst | Example 1 | Impregnated 7% Ni-21% Mo | Example 1 | Impregnated 7% Ni-21% Mo |
| Temperature, °F | 693 | 695 | 589 | 591 |
| Pressure, p.s.i.g. | 1,713 | 1,654 | 804 | 796 |
| Space Velocity, LHSV | 0.49 | 0.81 | 0.82 | 1.35 |
| H₂ Throughput, s.c.f./bbl | 4,100 | 4,100 | 4,100 | 4,100 |
| Product Nitrogen, p.p.m. | 28 | 340 | 81 | 100 |
| Reaction Rate Constant, hr.⁻¹ | 2.3 | 1.75 | 1.6 | 2.8 |

The calculated reaction rate constant takes into account the differences in space velocity, and is therefore a direct index of the relative activities. The above data show that the catalyst of Example 1, prepared in accordance with the invention, is about 30% more active than the impregnated catalyst for the removal of nitrogen from the heavy gas oil although it is about 40% less active for removing nitrogen from the light cycle oil. It will be noted that the heavy feed boiled substantially above 750° F. and had a relatively high initial nitrogen content of above 1000 p.p.m.

The following example illustrates the preparation of a catalyst in accordance with the invention having a lower molybdenum content.

EXAMPLE 3

A catalyst was prepared following substantially the same procedure as in Example 1 except as follows: Less ammonium molybdate was used relative to the amount of aluminum, and aluminum nitrate was the salt dissolved. The molybdenum oxide-aluminum oxide coprecipitate was carefully washed, dried 48 hours at 300° F., and then calcined at 1100° F. for 4 hours before impregnating with nickel nitrate and again drying and calcining at 900° F. The final catalyst in this case analyzed 17.6% molybdenum and 6.6% nickel and had a surface area of 253 square meters per gram, a density of 1 gram per cubic centimeter, and a pore volume of 0.3 cubic centimeter per gram.

The following example presents a comparison of the catalyst prepared in Example 3 with the 7% nickel-21% molybdenum catalyst prepared by impregnation, in the removal of nitrogen compounds from hydrocarbon oils.

EXAMPLE 4

In duplicate runs the catalyst of Example 3 and the nickel-molybdenum impregnated catalyst were sulfided and then used to treat the light catalytically cracked cycle oil described in Table I. In separate runs the catalysts were used to treat another heavy straight run gas oil boiling from about 600° F. to about 850° F. and containing 2455 p.p.m. nitrogen. The relative activities of the catalysts in removing nitrogen from the respective feed stocks are shown in the following table.

Table III

| Feed | Light Cycle Oil | | Heavy Gas Oil | |
|---|---|---|---|---|
| Catalyst | Example 3 | Impregnated | Example 3 | Impregnated |
| Temperature, °F | 591 | 592 | 665 | 665 |
| Pressure, p.s.i.g. | 795 | 786 | 1,505 | 1,527 |
| Space Velocity, LHSV | 1.0 | 1.0 | 0.75 | 0.75 |
| H₂ Throughput, s.c.f./bbl | 3,740 | 3,710 | 5,180 | 4,900 |
| Product Nitrogen, p.p.m. | 68 | 41 | 705 | 735 |
| Reaction Rate Constant, hr.⁻¹ | 2.6 | 3.0 | 0.93 | 0.90 |

The above data again show that the catalyst of this invention, prepared in Example 3 by coprecipitating the molybdenum and aluminum and then impregnating the nickel, is less effective in removing the nitrogen compounds found in the light cracked cycle oil, but is more effective in removing the nitrogen compounds found in the heavy gas oil, as compared to the catalyst prepared entirely by impregnation of alumina. Hence, the catalysts prepared in part by coprecipitation are surprisingly peculiarly suited to the purification of heavy oils. It will also be noted that the catalyst prepared in part by coprecipitation in Example 3 is more active for the purification of heavy oils even though it has a lower molybdenum content than the 7% Ni-21% Mo impregnated catalyst. Because of its lower molybdenum content the catalyst tends inherently to be less expensive to produce.

The effects of various conditions used in preparing catalysts containing between 15.5% and 20% molybdenum by the combination of coprecipitation of aluminum and molybdenum followed by impregnation with nickel, in accordance with the invention, was extensively studied. The results of these experiments may be summarized as follows. The pH during coprecipitation must be controlled near neutrality, preferably about 7.2, but temporary excursions to as low as pH 5 are tolerable whereas excursions above 8.5 pH result in inferior catalysts. The temperature during drying of the coprecipitate should not be much above 300° F. until substantially dry, 400° F. causing lower activity, and is preferably below 250° F. On the other hand, the dried coprecipitate should be calcined at 1100–1200° F. for maximum final activity. Calcinations at 1000° F. and 900° F. gave progressively lower activity, but calcination at 1300° F. did not give any better results than 1200° F. Calcination after nickel impregnation shows a converse relationship, with temperatures near 900° F. being preferred though a range from 700° F. to 1100° F. is permissible. The nickel content of the finished catalyst should not be greater than one-half the molybdenum content, percent by weight as metals in the calcined catalyst, as catalysts containing 20% Mo had progressively lower activity as the nickel content was increased from 10% to 11% and to 12%. The use of glue, gelatin, or other proteinaceous material in the coprecipitation aids in making the coprecipitate more cohesive, but has little ascertainable effect on the final catalyst activity, having been omitted entirely on several occasions without ill effect.

The following example illustrates another embodiment of the invention wherein the nickel oxide-molybdenum oxide-alumina catalyst formed by impregnating the molybdenum oxide-aluminum oxide coprecipitate with nickel and then calcining, is impregnated with an additional amount of molybdenum and then calcined to form the final catalyst.

EXAMPLE 5

A dilute solution of ammonium molybdate in ammonium hydroxide was mixed with an acidic solution of aluminum chloride to form a coprecipitate, which was then separated from the supernatant liquor, dried, and calcined. The calcined coprecipitate was then impregnated with nickel nitrate, dried and calcined, and then impregnated by immersing in a solution of aqueous ammonium molybdate, dried, and calcined. The finished catalyst contained 4.9% nickel and 15.6% molybdenum and had a surface area of 176 square meters per gram.

EXAMPLE 6

The activity of the catalyst prepared in Example 5 was compared with that of the high metal content nickel-molybdenum-alumina catalyst prepared by impregnation and also compared with another catalyst prepared in the same manner as the catalyst of Example 5 with the exception that cobalt nitrate was substituted for nickel nitrate in the impregnation of the molybdenum oxide-aluminum oxide coprecipitate to form a catalyst which, after impregnation with the additional amount of molybdenum, contained 15.6% molybdenum and 5.3% cobalt, hereinafter referred to as the catalyst of Example 6. A light catalytically cracked cycle oil of 25.4° API gravity, boiling from about 415° F. to about 550° F. and initially containing 900 p.p.m. nitrogen, was treated by contacting with the catalyst at 616° F., 800 p.s.i.g., 1.0 LHSV, and 4000 s.c.f. H₂/bbl. In similar tests the same feed was treated by contacting with the aforementioned reference catalyst A containing 6.8% molybdenum and 2.7% cobalt. The results of these tests are presented in the following table:

*Table IV*

|  | 4.9% Ni–15.6% Mo Catalysts of Example 5 | 7% Ni–21% Mo Impregnated Catalyst | 5.3% Co–15.6% Mo Catalyst of Example 6 | 2.7% Co–7.8% Mo Catalyst A |
|---|---|---|---|---|
| Product: |  |  |  |  |
| P.p.m. Nitrogen | 0.9 | 1.5 | 96 | 244 |
| Percent Nitrogen Removed | 99.9 | 99.8 | 89 | 73 |
| Relative Activity | 5.0 | 4.5 | 1.7 | 1.0 |

The above data show that the catalyst of Example 6, containing cobalt rather than nickel, is only about one-third as active as the nickel-containing catalyst of Example 5 even though the same preparation procedure was used. It will further be noted that the catalyst prepared in accordance with the invention as in Example 5 is superior to the impregnated nickel-molybdenum catalyst of higher nickel content even for the treatment of this relatively low boiling hydrocarbon oil. In this respect it will further be noted that the catalyst of Example 5 is superior to the catalyst of Example 3 wherein there was no additional impregnation of the molybdenum oxide-aluminum oxide composite after impregnating with nickel. Moreover the catalyst of Example 5 appears to be substantially equal in activity to the catalyst of Example 1, containing nearly twice as much molybdenum thereby indicating that the catalysts prepared by a method including the step of coprecipitating molybdenum and aluminum and then impregnating the nickel thereon have uniform high activity substantially independent of molybdenum content in this range as compared to the nickel-molybdenum-alumina catalysts prepared entirely by impregnation, which have peak activity in the range between about 19% molybdenum and about 25% molybdenum with somewhat lower activity both below and above this range.

The following tabulation presents a summary of the above examples of relative activity for nitrogen removal together with the results of similar relative activity tests performed on a wide variety of catalysts containing different amounts of molybdenum, nickel, and cobalt.

*Table V*

| Catalyst Designation | Wt. Percent Mo | Wt. Percent Co | Wt. Percent Ni | Support | Relative Activity |
|---|---|---|---|---|---|
| Commercial Catalyst A | 6.8 | 2.7 |  | Alumina | 1.0 |
| Commercial Catalyst B | 8.3 | 2.7 |  | do | 0.75 |
| Commercial Catalyst C | 6.5 | 2.4 |  | do | 1.4 |
| Commercial Catalyst G | 11 | 3.8 | 0.3 | do | 1.1 |
| Commercial Catalyst H | 7.4 | 0.2 | 0.13 | do | 1.2 |
| Commercial Catalyst I | 7.1 | 2.1 | 3.3 | 95/5, Alumina/Silica | 1.7 |
| Impregnated Catalyst J | 18.9 |  | 4.7 | Alumina | 3.8 |
| Impregnated Catalyst M | 21.8 |  | 7.6 | do | 4.6 |
| Impregnated Catalyst N | 21.8 |  | 10.0 | do | 3.8 |
| Impregnated Catalyst K | 24.3 |  | 4.1 | do | 3.7 |
| Example 1 | 30 |  | 7 | Mo-Al coprecipitate | ¹ 5.0 |
| Example 3 | 17.6 |  | 6.6 | do | ¹ 4.9 |
| Example 5 | 15.6 |  | 4.9 | do | 5.0 |
| Example 6 | 15.6 | 5.3 |  | do | 1.7 |
| Impregnated Catalyst R | 28 | 6.7 |  | Alumina | 1.4 |
| Impregnated Catalyst E | 15.3 |  | 2.7 | do | 1.5 |

¹ Comparison with high-boiling feed.

In the above table the commercial catalyst A has been previously described herein. Catalysts B, C, G, H, and I are other commercial catalysts, the exact methods of preparation of which are not known. The impregnated catalysts J, M, N, and K are described in our aforementioned copending applications Serial Nos. 12,319 and 90,382, being prepared by impregnation of preformed alumina supports with aqueous solutions of nickel compounds and molybdenum compounds. Catalyst R is a catalyst prepared in a similar manner with the exception that cobalt was used instead of nickel, and catalyst E is another catalyst prepared by a similar procedure but with a lower nickel content and with a molybdenum content just below that found to be necessary for high activity for nitrogen removal. It is clear from the above data that the catalysts of Examples 1, 3 and 5 herein, representing the practice of this invention, are surprisingly different in activity from all of the other catalysts and that this activity difference must be associated with some synergistic effects among the metal species, concentrations, and methods by which the components are brought together to form the porous catalysts.

As mentioned the catalysts prepared in accordance with the invention are surprisingly peculiarly suited for use in a process having as its objective the removal of contaminating nitrogen compounds from high boiling oils by hydrogenating said compounds to ammonia.

The removal of contaminating nitrogen compounds from hydrocarbon distillates to very low residual levels is of particular value where the distillate is to be converted in a low temperature hydrocracking process. In the low temperature hydrocracking process a hydrocarbon distillate of low nitrogen content is contacted with certain dual function catalysts, such as cobalt or nickel sulfide on a silica-alumina cracking catalyst support, under controlled conditions of temperature, pressure, hydrogen throughput, and space velocity, to effect a substantial conversion of the feed to liquid products boiling below the initial boiling point of the feed and containing a high ratio of iso- to normal-paraffins, with negligible coke production and only a very small production of light gaseous hydrocarbons. Pretreatment of the feed to a low temperature hydrocracking process to reduce the nitrogen content to less than 10 p.p.m. permits the use of lower operating temperatures (e.g., below 700° F.), extends the on-stream time, and results in a more favorable product distribution. More favorable results are obtained when the feed has a nitrogen content of only 1–2 p.p.m. Nitrogen contents below 1 p.p.m. are considerably more advantageous. It is particularly desired to be able to purify high boiling oils to make them suitable for low temperature hydrocracking as such oils are generally available in such abundance as to present a disposal problem to the petroleum refiner, thereby lowering their value. The incremental value gained by converting such oils to valuable gasoline and other lower boiling products thus provides considerable incentive for converting them wherever possible. The oils which it is particularly desired to convert by hydrocracking are those boiling substantially above 750° F., i.e., at least 20% above 750° F., and particularly oils having end boiling points of 850° F., and above, especially oils having high nitrogen contents if above 1000 p.p.m. The catalysts of this invention, as shown are peculiarly suited to the purification of just such oils.

The process whereby the nitrogen compounds initially contained in the hydrocarbon oil are hydrogenated to ammonia may be carried out in a number of ways, such as by maintaining the catalyst in a slurry or fluidized bed or as a down-flowing column of granular solids. The process is preferably carried out using one or more fixed beds of catalyst in a reactor through which the oil and hydrogen are passed. Of course, several reactors may be used, with parallel and/or series flow of hydrocarbon, upflow or downflow, concurrent or countercurrent to $H_2$. In many cases it is advantageous to use two beds in series with removal of $NH_3$ from the effluent of the first prior to passing that effluent to the second bed. The $NH_3$ is readily removed from the product oil by contacting with water, acid, or solid adsorbents. Since the nickel-molybdenum catalysts of this invention maintain their high activity over protracted periods of use, a continuous non-regenerative type of operation is obtainable and is normally perferred. The catalysts may be regenerated periodically by the oxidative removal of carbon deposits formed during extended use.

Conditions of temperature, pressure, hydrogen throughput, and space velocity in the reactor are correlated to provide the desired degree of nitrogen removal. Higher temperatures, pressures, and/or hydrogen throughputs are used when treating the higher boiling feed stocks and those containing the more refractory nitrogen compounds. A particular advantage of the process is that it permits the hydrodenitrification of refractory stocks at comparatively mild conditions of temperature and pressure and/or the use of high space velocities. The term "refractory" is used herein with reference to the relative difficulty with which nitrogen is removed from the respective feed stocks. In general, the complex nitrogen compounds found in high boiling hydrocarbon fractions and cracked cycle oils are considered more resistant to hydrogenation than those found in the lower boiling hydrocarbon fractions and straight-run distillates.

Temperature has a large influence on the rate of conversion of the nitrogen compounds and is adjusted upwards to maintain the hydrodenitrification rate as the catalyst ages or is deactivated through protracted use. The temperature should be in the range 500–850° F., preferably 550–800° F., and still more preferably 600–750° F. The rate of hydrodenitrification is fairly low at temperatures below 550° F. At temperatures above 800° F. coke formation tends to increase markedly. With less active catalysts than those of the present invention the temperature at the start of the run must be much higher, and the on-stream time between catalyst regenerations is correspondingly reduced. The active hydrodenitrification catalysts of the present invention make possible the use of temperatures at the lower end of the operating range for long periods of time.

Elevated pressures advantageously influence the rate of hydrodenitrification as well as extending the catalyst activity and life. Pressures as low as 200 p.s.i.g. may be employed when treating light naphthas, whereas pressures up to 4000 p.s.i.g. may be advisable for the substantially complete hydrodenitrification of highly refractory and high boiling stocks. Using the highly active catalysts of this invention the pressure will generally be in the range 1000–2500 p.s.i.g. for high boiling feeds.

Hydrogen throughput rate is maintained above about 500 s.c.f./bbl. of hydrocarbon oil, and is preferably in the range 1000–10,000 s.c.f./bbl. More generally, at least sufficient hydrogen is provided to supply that consumed in the conversion of the nitrogen compounds and to compensate for incidental hydrogenation of unsaturates and oxygen, sulfur, and halogen compounds, while maintaining a significant excess of hydrogen partial pressure. Hydrogen consumption may range from 100 to 2000 s.c.f. per barrel depending on the properties of the oil and the conditions used. Excess hydrogen is separated from the treated oil and preferably recycled. The use of more than 10,000 s.c.f. of $H_2$/bbl. does not generally produce sufficient improvement in conversion rate to justify the increased cost of circulating it.

Flow of oil relative to catalyst will generally be in the range 0.2–10 LHSV. In treating high boiling oils, however, the space velocity should be at least 0.3 LHSV. Also, it is generally more advantageous to use a space velocity below about 3 with a lower temperature and pressure rather than a higher space velocity and temperature.

To obtain high activity for the hydrodenitrification process the nickel oxide-molybdenum oxide-alumina catalysts must be sulfided prior to contacting with the hydrocarbon oils to be treated. Sulfiding is preferably accomplished by passing over the oxide catalyst a sulfiding agent such as $H_2S$, $CS_2$, mercaptans, disulfides, and the like. When $H_2S$ is used, the sulfiding may be effected with or without a carrier gas such as hydrogen or nitrogen. High activity catalysts have been prepared by sulfiding directly with pure $H_2S$. Where sulfur compounds other than $H_2S$ are employed, hydrogen should also be present, preferably under pressure, and the temperature should be sufficiently elevated for ready conversion of the sulfur compound to $H_2S$, say about 400° F. in the case of mercaptans and disulfides. Extensive reduction of the oxides to the metals is preferably avoided, since usually more active catalysts result if the oxides are sulfided directly. Further, to minimize reduction of the oxides, the temperature during sulfiding preferably should not exceed 750° F., and more preferably is at or below 650° F.

The catalysts may be used for other purposes in the oxidized or reduced state, such as for the hydrogenation of organic compounds or hydrocarbon oils free of sulfur, or for reforming or hydrocracking of clean hydrocarbon oils by contacting at higher temperatures above 850° F. The catalysts in the sulfided condition also find utility in hydrofining processes for removing sulfur from distillates, for removing metal contaminants from high boiling gas oils such as the feed to a catalytic cracker, and for improving the color and stability of materials such as furnace oils, lubricating oils, and waxes.

We claim:

1. A process for removing contaminating nitrogen compounds from high-boiling hydrocarbon oil by hydrogenating said compounds to ammonia, which comprises contacting a hydrocarbon oil a substantial portion of which boils above 750° F. and containing contaminating nitrogen compounds, together with 500–10,000 s.c.f. $H_2$/barrel, at 550–800° F., 1000–4000 p.s.i.g., and 0.3–3 LHSV with a sulfided catalyst prepared by a method including the steps of simultaneously precipitating a compound of molybdenum and a compound of aluminum by mixing solutions containing said metals to form a coprecipitate, calcining said coprecipitate to form a molybdenum oxide-aluminum oxide composite, impregnating the calcined composite with a nickel compound convertible to the oxide by calcination, calcining the impregnated composite tof orm a nickel oxide-molybdenum oxide-alumina catalyst, containing between 4 and 10% by weight nickel expressed as metal and at least 15.5 but below 19% by weight molybednum expressed as metal, and sulfiding the catalyst having said metal contents.

2. The process of claim 1 wherein said oil has an end boiling point of at least 850° F.

3. The process of claim 1 wherein said coprecipitate is calcined at a temperature between 1000° F. and 1300° F.

References Cited by the Examiner
UNITED STATES PATENTS

| | | | |
|---|---|---|---|
| 2,878,193 | 3/1959 | Scott | 208—216 |
| 2,905,636 | 9/1959 | Watkins et al. | 208—216 |
| 3,114,701 | 12/1963 | Jacobson et al. | 208—254 |

DELBERT E. GANTZ, *Primary Examiner.*

ALPHONSO D. SULLIVAN, LEON ZITVER,
*Examiners.*